(12) United States Patent
Finsterbusch et al.

(10) Patent No.: US 10,382,539 B1
(45) Date of Patent: Aug. 13, 2019

(54) METHODS AND APPARATUS FOR DATA CONTROL AND TRANSFER WITH AN UNMANNED AERIAL VEHICLE

(71) Applicant: Cape Productions Inc., Redwood City, CA (US)

(72) Inventors: Thomas Finsterbusch, Mountain View, CA (US); Gabriel Charalambides, Redwood City, CA (US); Andrej Finsterbusch, Falkensee (DE); John David Stockford, Redwood City, CA (US); Alexander Loo, Redwood City, CA (US); Anthony Rizk, Cupertino, CA (US); Richard Stephen Pasetto, Mountain View, CA (US)

(73) Assignee: Cape Productions Inc., Redwood City, CA (US)

( * ) Notice: Subject to any disclaimer, the term of this patent is extended or adjusted under 35 U.S.C. 154(b) by 216 days.

(21) Appl. No.: 15/611,644

(22) Filed: Jun. 1, 2017

Related U.S. Application Data

(60) Provisional application No. 62/399,951, filed on Sep. 26, 2016, provisional application No. 62/344,276, filed on Jun. 1, 2016.

(51) Int. Cl.
| | |
|---|---|
| *H04L 29/08* | (2006.01) |
| *G05D 1/00* | (2006.01) |
| *H04L 29/06* | (2006.01) |
| *G05D 1/10* | (2006.01) |

(Continued)

(52) U.S. Cl.
CPC ........ *H04L 67/1091* (2013.01); *B64C 39/024* (2013.01); *G05D 1/0016* (2013.01); *G05D 1/0022* (2013.01); *G05D 1/0038* (2013.01); *G05D 1/101* (2013.01); *G08G 5/006* (2013.01); *H04L 65/4069* (2013.01); *H04L 65/608* (2013.01); *H04L 67/1085* (2013.01); *H04L 67/1093* (2013.01); *H04L 67/146* (2013.01);

(Continued)

(58) Field of Classification Search
CPC .................................................. H04L 67/1091
See application file for complete search history.

(56) References Cited

U.S. PATENT DOCUMENTS

| | | | | |
|---|---|---|---|---|
| 9,292,705 | B2 * | 3/2016 | Lemmey | G06F 21/62 |
| 9,540,121 | B2 * | 1/2017 | Byers | B64C 39/024 |
| 9,613,539 | B1 * | 4/2017 | Lindskog | G08G 5/04 |

(Continued)

*Primary Examiner* — Hussein Elchanti
*Assistant Examiner* — Michael A Berns
(74) *Attorney, Agent, or Firm* — Brian R. Short

(57) ABSTRACT

A system has a drone session server to collect drone session information. A drone user machine is in a client relationship with the drone session server. A drone control machine is in a client relationship with the drone session server and a peer-to-peer relationship with the drone user machine. The drone control machine is configured to relay video data from a drone to the drone user machine via a peer-to-peer connection. The drone control machine evaluates user commands collected by the drone user machine that are relayed to the drone control machine via the peer-to-peer connection to produce enforced limits commands to maintain the drone within a three-dimensional geographical fence. The drone control machine sends autopilot commands to the drone to transport the drone from the three-dimensional geographical fence to a land site to complete a drone session.

9 Claims, 6 Drawing Sheets

(51) Int. Cl.
*B64C 39/02* (2006.01)
*G08G 5/00* (2006.01)

(52) U.S. Cl.
CPC ........ *H04L 67/42* (2013.01); *B64C 2201/141* (2013.01); *B64C 2201/146* (2013.01)

(56) References Cited

U.S. PATENT DOCUMENTS

| | | | |
|---|---|---|---|
| 9,654,476 B2* | 5/2017 | Lemmey | G06F 21/62 |
| 9,678,506 B2* | 6/2017 | Bachrach | G05D 1/0016 |
| 9,891,621 B2* | 2/2018 | Bachrach | G05D 1/0016 |
| 9,928,748 B2* | 3/2018 | Chan | G08G 5/006 |
| 10,083,615 B2* | 9/2018 | Chan | G08G 5/006 |
| 2015/0370250 A1* | 12/2015 | Bachrach | G05D 1/0016 |
| | | | 701/2 |
| 2016/0107749 A1* | 4/2016 | Mucci | B64C 39/024 |
| | | | 701/3 |
| 2018/0329413 A1* | 11/2018 | Charalambides | B64C 39/00 |
| 2018/0342329 A1* | 11/2018 | Rufo | G16H 40/67 |
| 2019/0072949 A1* | 3/2019 | Charalambides | B64C 39/00 |
| 2019/0109900 A1* | 4/2019 | Charalambides | B64C 39/00 |

\* cited by examiner

METHODS AND APPARATUS FOR DATA CONTROL AND TRANSFER WITH AN UNMANNED AERIAL VEHICLE

CROSS-REFERENCE TO RELATED APPLICATIONS

This application claims priority to U.S. Provisional Patent Application Ser. No. 62/344,276, filed Jun. 1, 2016 and U.S. Provisional Patent Application Ser. No. 62/399,951, filed Sep. 26, 2016, the contents of each referenced provisional patent application are incorporated herein by reference.

FIELD OF THE INVENTION

This application relates generally to the control of unmanned aerial vehicles, commonly referred to as drones. More particularly, this invention is directed toward a peer-to-peer network based operation of an unmanned aerial vehicle.

BACKGROUND OF THE INVENTION

The military relies upon proprietary, secure, high-speed networks for remote manipulation of a drone. Commercially available drones continue to drop in price. There is a growing desire to find safe and cost effective deployments of such drones. It would be desirable to remotely manipulate a commercially available drone without the need for the elaborate infrastructure deployed by the military.

SUMMARY OF THE INVENTION

A system has a drone session server to collect drone session information. A drone user machine is in a client relationship with the drone session. The drone control machine is in a client relationship with the drone session server and a peer-to-peer relationship with the drone user machine. The drone control machine is configured to relay video data from a drone to the drone user machine via a peer-to-peer connection. The drone control machine sends autopilot commands to lift off the drone and direct the drone into a three-dimensional geographical fence. The drone control machine evaluates user commands collected by the drone user machine that are relayed to the drone control machine via the peer-to-peer connection to produce enforced limits commands to maintain the drone within the three-dimensional geographical fence. The drone control machine sends autopilot commands to the drone to transport the drone from the three-dimensional geographical fence to a land site to complete a drone session.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
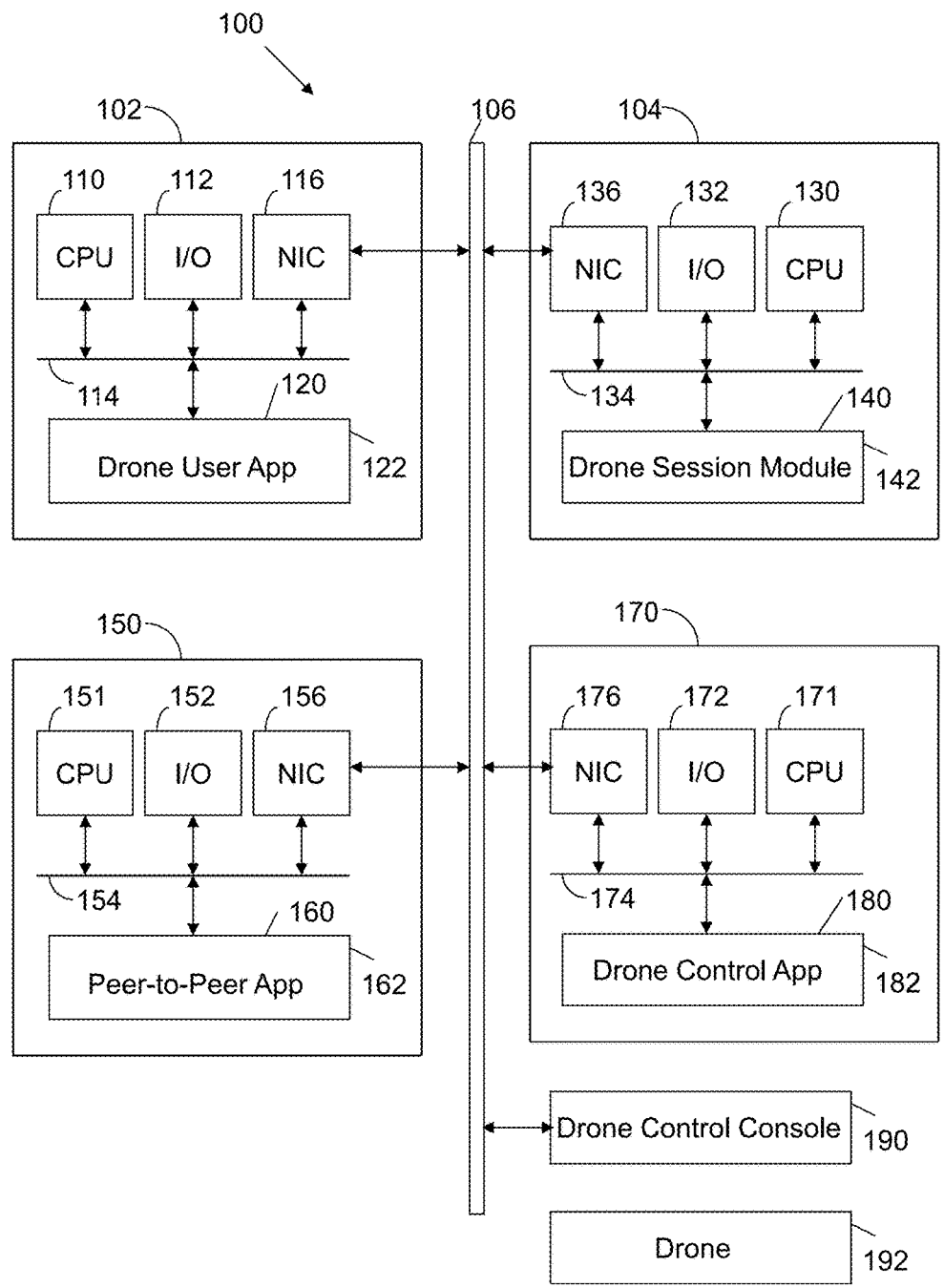
FIG. 1 illustrates a system configured in accordance with an embodiment of the invention.

FIG. 1 illustrates a system 100 configured in accordance with an embodiment of the invention. The system 100 includes a drone user machine 102 connected to a drone session server 104 via a network 106, which may be any combination of wired and wireless networks. The drone user machine 102 may be a desktop computer, laptop computer, tablet, mobile device, game console, wearable device and the like. The drone user machine has a processor, such as a central processing unit 110, connected to input/output devices 112 via a bus 114. The input/output devices 112 may include a keyboard, mouse, touch display and the like. A network interface circuit (NIC) 116 is also connected to the bus 114 to provide connectivity to network 106. A memory 120 is also connected to the bus. The memory 120 stores instructions executed by the processor 110. In particular, the memory 120 stores a drone user application 122 to coordinate the remote piloting of a drone that is not in viewable range of the user of the drone user machine 102. As detailed below, the drone user machine 102 may be used to pilot a drone thousands of miles away. The drone user machine 102 receives video from the drone and supplies to the drone user commands. The user commands may be keyboard strokes, gestures to a touch display, game console inputs and the like. The user commands may relate to x-axis, y-axis, z-axis, roll, pitch and yaw instructions for the drone. In addition, the user commands may include positional commands for a gimbal holding a video camera.

The drone session server 104 includes standard components, such as a processor 130, input/output devices 132, a bus 134 and a network interface circuit 136 to provide connectivity to network 106. A memory 140 is connected to the bus. The memory 140 stores instructions executed by the processor 130 to implement operations disclosed herein. In one embodiment, the memory 140 stores a drone session module 142. The drone session module 140 records information about a drone session. For example, the drone session module 140 may include executable instructions to assign a session number, collect a session connection time, a session take-off time, a user control time, and an autopilot resume time. The drone session module 140 may also include executable instructions to evaluate a drone session. For example, parameters related to the drone session may be compared against normative parameters for a drone session (e.g., avoid geographical fence, avoid stationary obstacles, avoid airborne obstacles, etc.). The drone session module 142 may collect such data and provide drone session analytics.

System 100 also includes a peer server 150. The peer server 150 includes components, such as a processor 151, input/output devices 152, a bus 154 and a network interface circuit 156. A memory 160 is connected to the bus 154. The memory 160 stores a peer-to-peer application 162 with instructions executed by processor 151. The peer-to-peer application 162 supports peer-to-peer (P2P) computing, which is a distributed application architecture that partitions tasks or workloads between peers. Each peer makes a portion of its resources, such as processing power, disk storage or network bandwidth, directly available to other network participants without the need for central coordination by a server. Peers are both suppliers and consumers of resources, in contrast to the traditional client-server model in which the consumption and supply of resources is divided. The peer machine 150 initializes a peer-to-peer connection between the drone user machine 102 and the drone control machine 170. Once the peer-to-peer connection is established, drone user machine 102 and drone control machine 170 communicate directly utilizing network 106.

The drone control machine 170 includes a processor 171, input/output devices 172, a bus 174 and a network interface circuit 176. A memory 180 is connected to the bus 174. The memory stores a drone control application 182 with instructions executed by the processor 171. The drone control application 182 sends drone operation instructions to a drone control console 190, which interacts with a drone 192. For example, the drone control application 170 may be executed on a tablet that is in wireless communication with a WiFi hub. The drone control machine 170 may have a hardwired (e.g., USB) connection to the drone control console 190. The drone control console 190 is typically used by a drone operator to fly a drone that is in the visual presence of the operator. In this instance, the operator is at the drone user machine 102, which is not in the visual presence of the drone.

Figure 2:
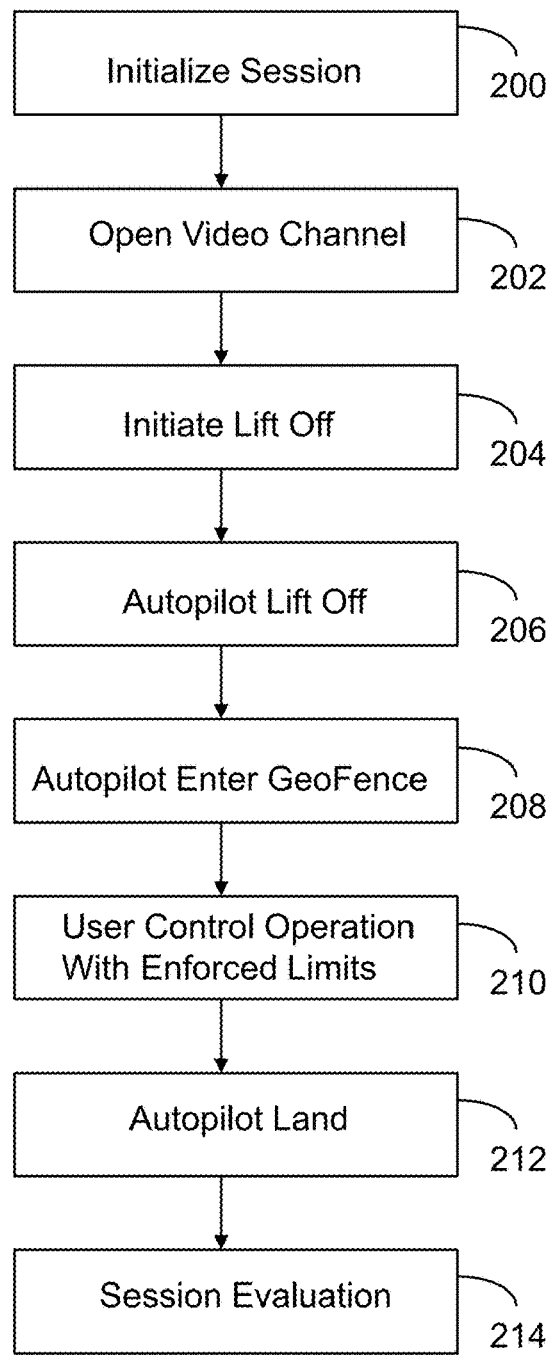
FIG. 2 illustrates simplified processing operations associated with an embodiment of the invention.

FIG. 2 illustrates processing operations associated with an embodiment of the invention. Initially, a session is initialized 200. This may entail a drone technician placing a drone on a launch pad and advising the drone session server 104 of the availability of the drone. That is, the drone control machine 170 sends a signal to the drone session server 104 indicating the availability of the drone.

A video channel is then opened 202. That is, a video camera on the drone is turned on. A video supply is fed via a peer-to-peer connection from the drone control machine 170 to the drone user machine 102. This process is discussed in detail below in connection with the discussion of FIGS. 3 and 4. This allows the drone user machine 102 to observe the drone video feed. The drone user machine 102 may then initiate lift off 204. That is, a signal is sent from the drone user machine 102, to the drone control machine 170 via the peer-to-peer connection to initiate lift off. This causes the drone control machine 170 to signal the drone control console 190, which deploys the lift off command to the drone 192. The drone control application 182 then coordinates an autopilot lift off 206 into a three-dimensional geographical fence (geofence) 208. FIG. 5 illustrates an example of a three-dimensional geofence 500.

Figure 6:
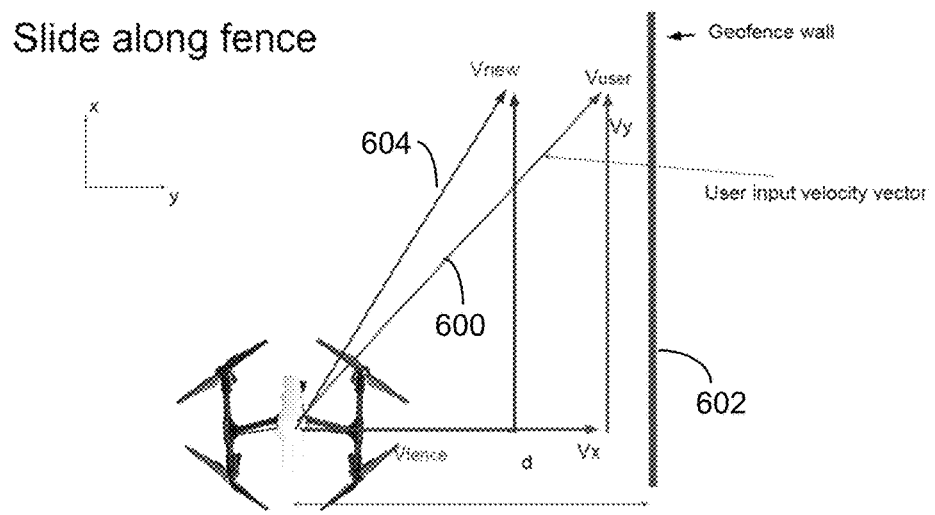
FIG. 6 illustrates user control with enforced limits in accordance with an embodiment of the invention.

Once inside the geofence, a user at the drone user machine 102 can control the operation of the drone with enforced limits 210. That is, the user at the drone user machine 102 sends commands to the drone control machine 170 via the peer-to-peer connection. The drone control application 182 enforces limits on the commands to ensure safe drone operation. For example, the limits may constrain the drone to remain within the geofence. For example, FIG. 6 illustrates a user command vector 600 that will rapidly engage a geofence wall 602. The drone control application 182 produces a revised vector 604 to prevent engagement with the geofence wall 602. The drone control application enforces similar limits with respect to stationary objects and airborne objects within the geofence, as discussed below. In response to a command from the drone user machine 102, a predetermined timeout or a low battery condition, autopilot is invoked to first fly the drone safely to its takeoff location and then to land the drone 212. Thereafter, the session is evaluated 214. That is, the drone session server 104 receives drone session parameters throughout the session. The drone session module 142 evaluates the drone session parameters to determine whether the drone session was a success. The drone session module 142 may maintain flight data for multiple sessions and thereby supply drone analytic data in response to requests from the drone user machine 102 or the drone control machine 170.

Figure 3:
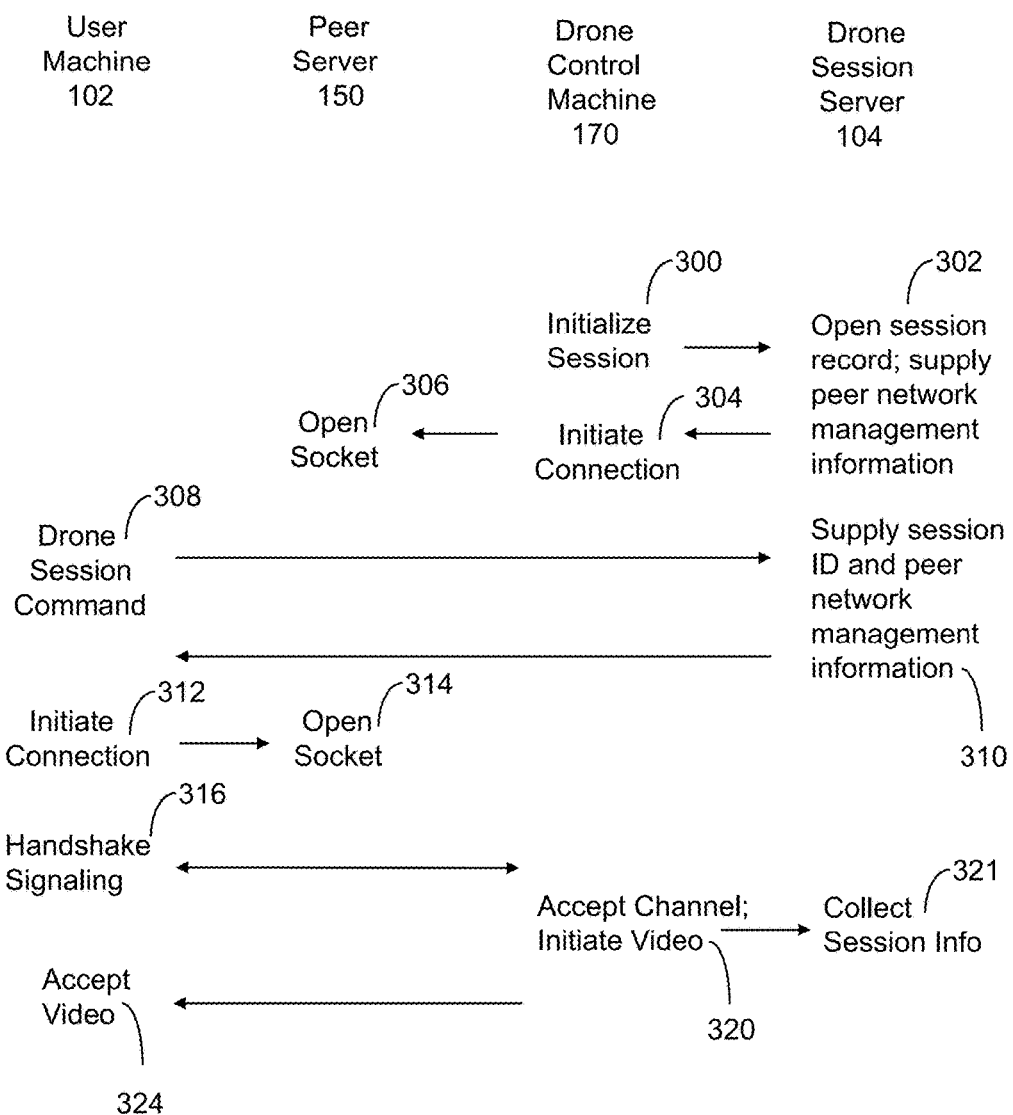
FIG. 3 illustrates distributed processing operations performed in accordance with an embodiment of the invention.
Figure 4:
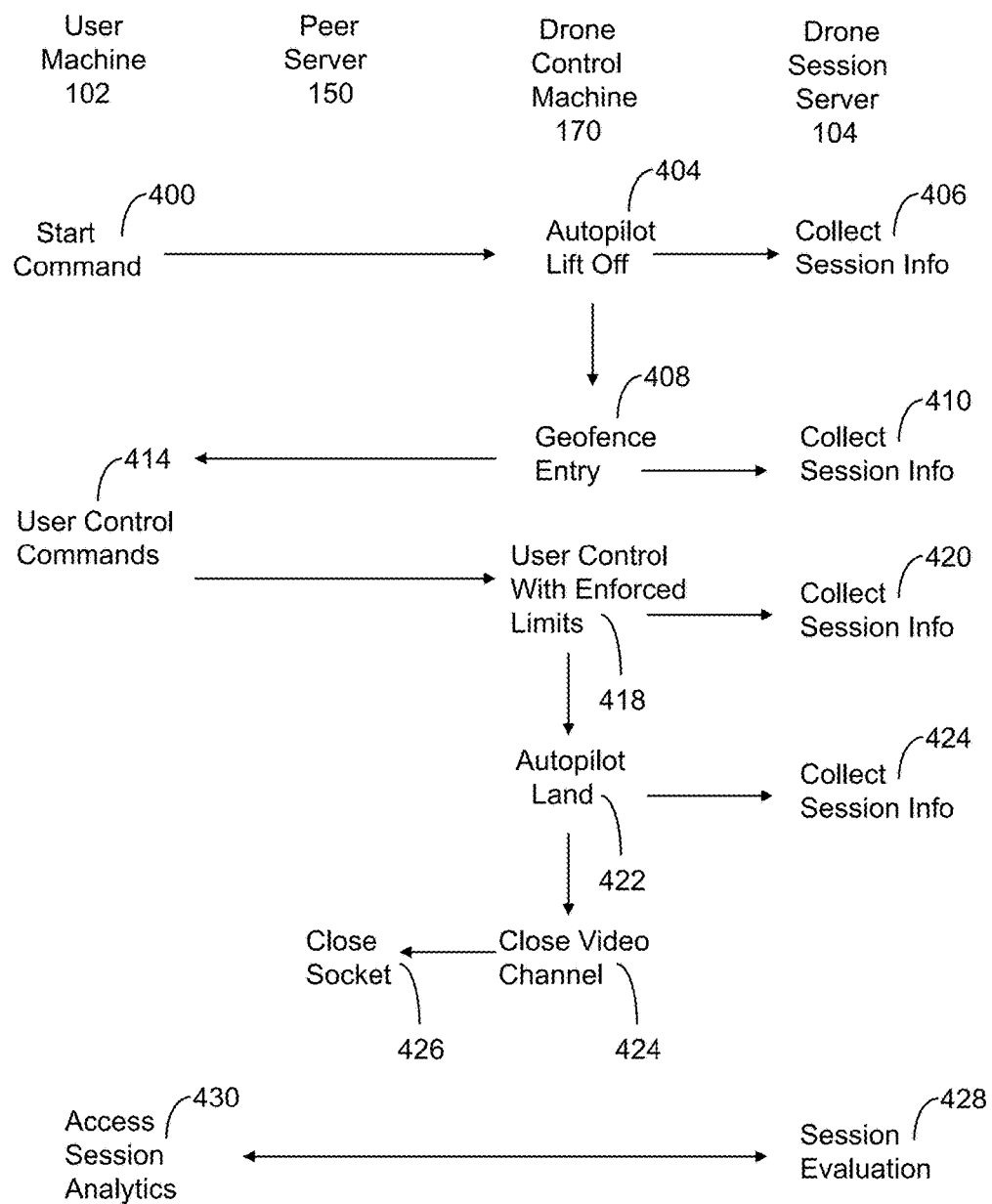
FIG. 4 illustrates distributed processing operations performed in accordance with an embodiment of the invention.
Figure 5:
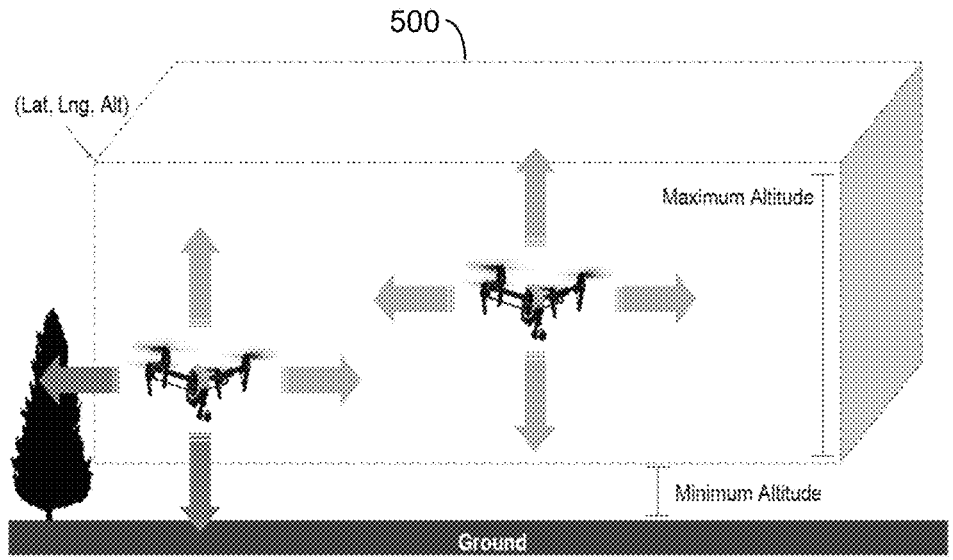
FIG. 5 illustrates a geographical fence utilized in accordance with an embodiment of the invention.

The operations of FIG. 2 are more fully characterized in FIGS. 3 and 4. FIG. 3 illustrates operations performed by the different machines in system 100. The drone control machine 170 initializes a session 300. For example, the drone control application 180 may include a menu with an option to create a new drone session. That menu selection may result in a call to drone session server 104 over network 106. In this context, the drone control machine 170 is operative as a client to drone session server 104. The call to the drone session server 104 may be an HTTP post command with parameters, such as session live=true and session_in_progress=false.

In response, the drone session server 104 opens a session record and supplies peer network management information 302. For example, the drone session module 140 may open a record for a new session and assign it a session identification. The peer network management information may include the session identification and peer information that allows for a peer-to-peer connection between two machines.

The drone control machine 170 then initiates a connection 304 by opening a web socket 306 on peer server 150. A web socket is a communications protocol that provides full-duplex communication channels over a single Transmission Control Protocol connection. Once the user machine 102 opens its own socket at the peer server 150 a peer-to-peer connection is established. The duplex operation includes a channel with drone control commands from the drone user machine 102 and a channel with video data from the drone control machine 170, which obtains the video data from the drone 192 via the drone console 190. The peer server 150 uses the session identification and peer network management information to enable the peer-to-peer connection. Once the peer-to-peer connection is established, the peer server 150 is not involved in the communications between the drone control machine 170 and the drone user machine 102.

The drone user machine 102 may now be used to issue a drone session command 308. For example, the drone user application 122 may include a menu that allows a user to select a new drone session. As a result, the drone user machine 102 sends a signal across network 106 to server 104. Observe here that the drone user machine 102 is operative as a client of drone session server 104. The drone session server 104 supplies a session identification and peer network management information 310 to the drone user machine 102. The session identification corresponds to the previously opened session record. The network management information includes connection information to facilitate a peer-to-peer connection between the drone user machine 102 and the drone control machine 170.

The drone user machine 102 uses this information to initiate a connection 312. In particular, the drone user machine 102 opens the web socket 314 and then initiates handshake signaling 316. For example, a WebRTC signaling handshake maybe used. Web Real-Time Communication (WebRTC) is a collection of communication protocols and application programming interfaces that enable real-time communication over peer-to-peer connections. WebRTC is used to facilitate video conferencing. In this context, WebRTC is used to facilitate a one-way video feed from the drone control application 182 to the drone user machine 102 via a peer-to-peer connection. The handshake signaling 316 is communicated to drone control machine 170. The drone control machine 170 accepts the channel and initiates video 320. The drone control machine 170 may also advise the drone session server 104 of this event. The drone session server 104 collects the session information 321.

The initiated video is then sent to the user machine 102, which accepts the video 324. At this point, the user at drone user machine 102 can view the flight area via the video feed.

Turning to FIG. 4, the user at the drone user machine 102 issues a start command 400. For example, the drone user application 122 may include a menu item to start the drone session. This command is communicated as a peer-to-peer communication to the drone control machine 170, which initiates an autopilot liftoff 404. This event may then be reported to the drone session server 104, which collects the session information 406. Observe here that the drone control machine 170 is simultaneously operative in a peer-to-peer communication with drone user machine 102 and as a client with the drone session server 104.

The autopilot operation results in the drone being directed into the geofence 408. This event is reported to the drone session server 104, which collects the session information 410. This event is also reported to the drone user machine 102 via a peer-to-peer communication. At this point, user control commands 414 may be issued by the user machine 102. The user control commands may be velocity, acceleration, and directional commands initiated at an input device at the user machine 102. The user control commands may also include drone gimbal movement and camera functions. The input device may be a console, a keyboard, mouse, touch display and the like. Each user command is communicated as a peer-to-peer communication with the drone control machine 170. The drone control machine 170 deploys the user command with enforced limits 418. Various session events may be reported to the drone session server 104, which collects the session information 420.

Eventually, the drone control machine 170 initiates an autopilot land operation 422. This event is reported to the drone session server 104, which collects the session information 424. The video channel is then closed 424 by sending a signal to the peer server 150 to close the socket 426.

The drone session server 104 may then evaluate the session 428. Session analytics may then be accessed 430 by the drone user machine 102 and/or the drone control machine 170.

The disclosed autopilot operations are based upon a pre-computed waypoint path within the geofence. The drone take-off location is often outside of the geofence. In such a case, a waypoint path which is outside of the geofence is computed to reach the geofence. The waypoint path is evaluated against the current position of the drone. At all times, collision avoidance is enforced to avoid engagement with the geofence, a static obstacle (e.g, a tree) and an airborne obstacle (e.g., another drone or other aircraft). For example, if another drone on an autonomous mission appears within the geofence, autopilot may be invoked to position the drone in a safe location. Similarly, if a foreign aircraft (e.g., a plane) enters the geofence, autopilot may be invoked to position the drone in a safe location. The safe location may be a safe airborne position (latitude, longitude, altitude) or a land site. Autopilot may also be invoked in the event that wind blows the drone out of the geofence, in such a case, the autopilot returns the drone to the geofence. In the case where the takeoff location is outside of the geofence, autopilot waypoint directions transition the drone from the geofence to the takeoff location. The drone control application may also include a mode that allows a user of the drone control machine 170 to override autopilot and user commands. The user of the drone control machine 170 is in the presence of the drone 192 and therefore may have a unique understanding of a potential dangerous situation.

In one embodiment, collision avoidance is based on relative positioning between two drones, and velocity input manipulation to the drone performing the avoidance maneuvers. Consider the following situation. Drone A 700 is shown as 700 in FIG. 7. The drone is a teleoperated drone performing the avoidance maneuvers. Its position (latitude, longitude, altitude), current drone velocity (north, east, down), and input velocity to the drone (north, east, down) are known. Drone B 702 is a target drone to be avoided. Its position (latitude, longitude, altitude) are known. At a high level, the strategy is to map the teleoperators input (e.g. in the form of key presses) to an input velocity to drone A. If drone A is close to drone B and the attempted input velocity would bring drone A closer to drone B, redirect the input velocity to be away from drone B before sending the command to the drone. The amount to redirect the input velocity vector away from the target drone is a function of the three dimensional distance between the two drones.

Figure 7:
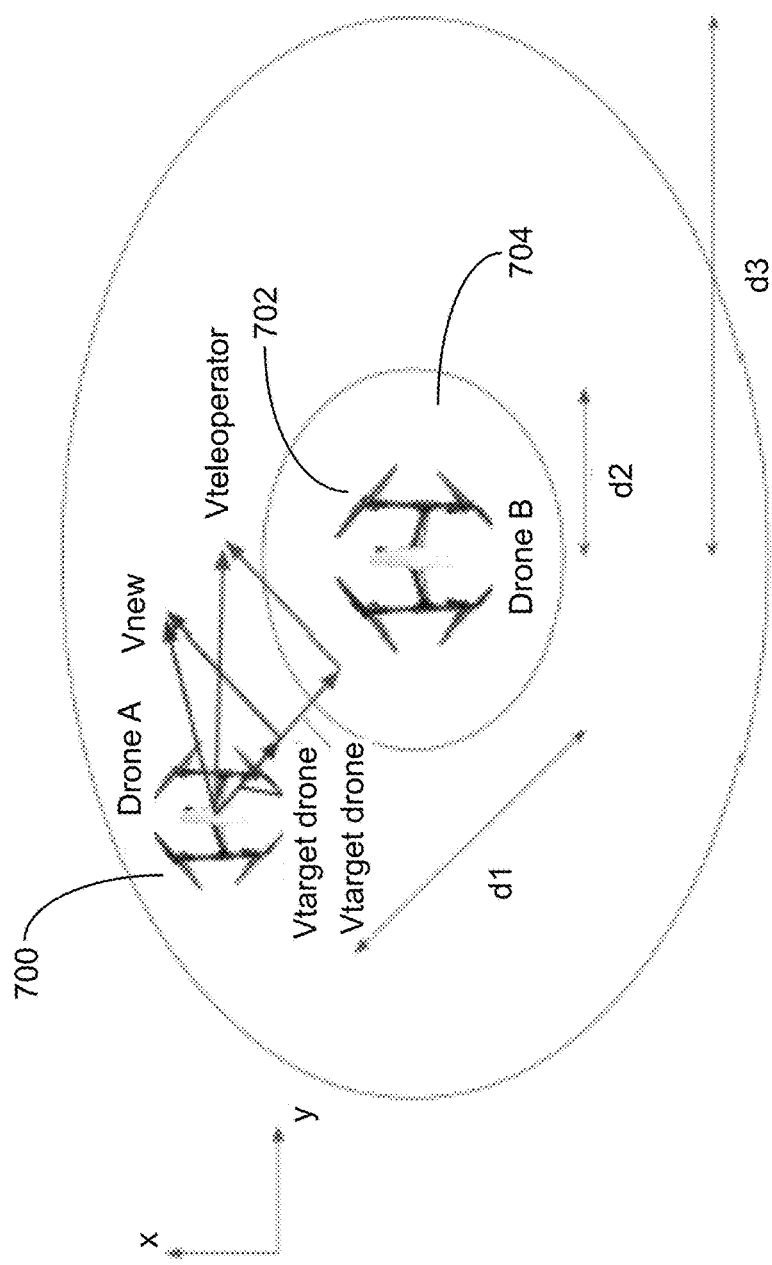
FIG. 7 illustrates airborne obstacle avoidance in accordance with an embodiment of the invention.

With this approach, each drone effectively forms a virtual safety sphere around itself. FIG. 7 illustrates such a sphere 704 for drone 702. If another drone attempts to fly into this drone, it will be rebounded away. Once the other drone enters the outer sphere, this rebounding effect begins. At the start of the inner sphere, any input velocity to drone A which would move it closer to drone B is not permitted.

Onboard sensing allows one to gather drone A's position and velocity. In order to receive drone B's position, each drone broadcasts its position via a socket (e.g., a User Datagram Protocol socket) and each other drone in the area listens to these position updates. More particularly, onboard sensor signals from drone 192 are relayed to the drone control console 190, which directs the signals to the drone control application 182 of drone control machine 170. The drone control machine 170 communicates with other drone control machines operating other drones in the area.

FIG. 7 shows a snapshot of the collision avoidance being performed. The teleoperator of drone A has attempted to issue a velocity input to the drone ($V_{teleoperator}$), which would cause the drone to move towards drone B. Since the two drones are a distance d1 from each other, and d1 is between the inner avoidance threshold d2 and an outer avoidance threshold d3, the input velocity is moderately redirected away from drone B. To do this, drone A's input velocity is decomposed into vector components. The velocity component which is in the direction of drone B ($V_{target\_drone}$) is then reduced. The amount this component is reduced is proportional to the Euclidean distance between the two drones. This value is scaled between the inner and outer thresholds (d2 and d3), i.e. if the drone A is a distance d2 away from the target drone, then reduce the velocity towards the target drone to zero. The input velocity component orthogonal to $V_{target\_drone}$ is preserved. The reduced component and the orthogonal component are combined to form the new input velocity vector which is issued to the drone ($V_{new}$). FIG. 7 is shown in the two dimensional plane for simplicity; in reality the same logic is used for the three dimensional case.

Returning to FIG. 2, the operation in block 210 may be omitted. That is, the disclosed system may be used to deploy autopilot drone sessions in which the video is streamed via peer-to-peer connections from a drone control machine 170 to one or more user machines 102.

The operations of FIG. 2 may also be implemented for multiple users. In one embodiment, every user is given control over the entire set of drone controls. As multiple users press different commands throughout a session, the drone control application 180 averages the signals into a set of final commands. For example, if three users attempt to move the drone to the right and one user attempts to move the drone forward, the drone moves to the right and slightly forward. Alternately, each user is given sole ownership over a specific drone control. For example, one user is enabled to move the drone forward and backward. Another user is enabled to move the drone left and right. Alternately, each user is given sole or shared ownership of different drone controls at different times throughout a session.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a drone session server to collect drone session information;
   a drone user machine in a client relationship with the drone session server;
   a drone control machine in a client relationship with the drone session server and connected through a network with the drone user machine, and in a peer-to-peer relationship with the drone user machine, the drone control machine is configured to:
   relay video data from a drone to the drone user machine through a drone console and the drone control machine and the network via a peer-to-peer connection wherein the drone console is within visual presence of the drone,
   send autopilot commands to the drone console to lift off the drone and direct the drone into a three-dimensional geographical fence,
   receive user command through the network from the drone user machine, wherein the drone user machine is operated by a user that is not within visual presence of the drone;
   generate a user command vector based on the received user commands,
   generate a revised vector based on the user command vector and the three-dimensional geographical fence for producing enforced limits commands to maintain the drone within the three-dimensional geographical fence,
   provide the enforced limits commands to the drone through the drone console; and
   send autopilot commands to the drone to transport the drone from within the three-dimensional geographical fence to a land site outside of the three-dimensional geographical fence to complete a drone session.

2. The system of claim 1 wherein the drone session server provides peer network management information to the drone user machine and the drone control machine.

3. The system of claim 1 wherein the enforced limits commands prevent the drone from colliding with a static obstacle.

4. The system of claim 1 wherein the enforced limits commands prevent the drone from colliding with an airborne obstacle.

5. The system of claim 1 wherein the enforced limits commands include autopilot override commands to maintain the drone in the three-dimensional geographical fence.

6. The system of claim 1 wherein the video data and user commands are relayed via the peer-to-peer connection, wherein the peer-to-peer connection is established by the drone control machine and the drone user machine accessing a session identification and peer network management information at a peer server.

7. The system of claim 6 wherein the drone control machine and the drone user machine exchange Web Real-Time Communication (WebRTC) signaling messages.

8. The system of claim 1 wherein the drone session server supplies drone session analytics.

9. The system of claim 1 wherein the drone control machine evaluates user commands collected by a plurality of drone user machines.

* * * * *